July 3, 1928.
C. SKLAREK
DIRIGIBLY MOUNTED LIGHT
1,675,915
Original Filed April 25, 1921
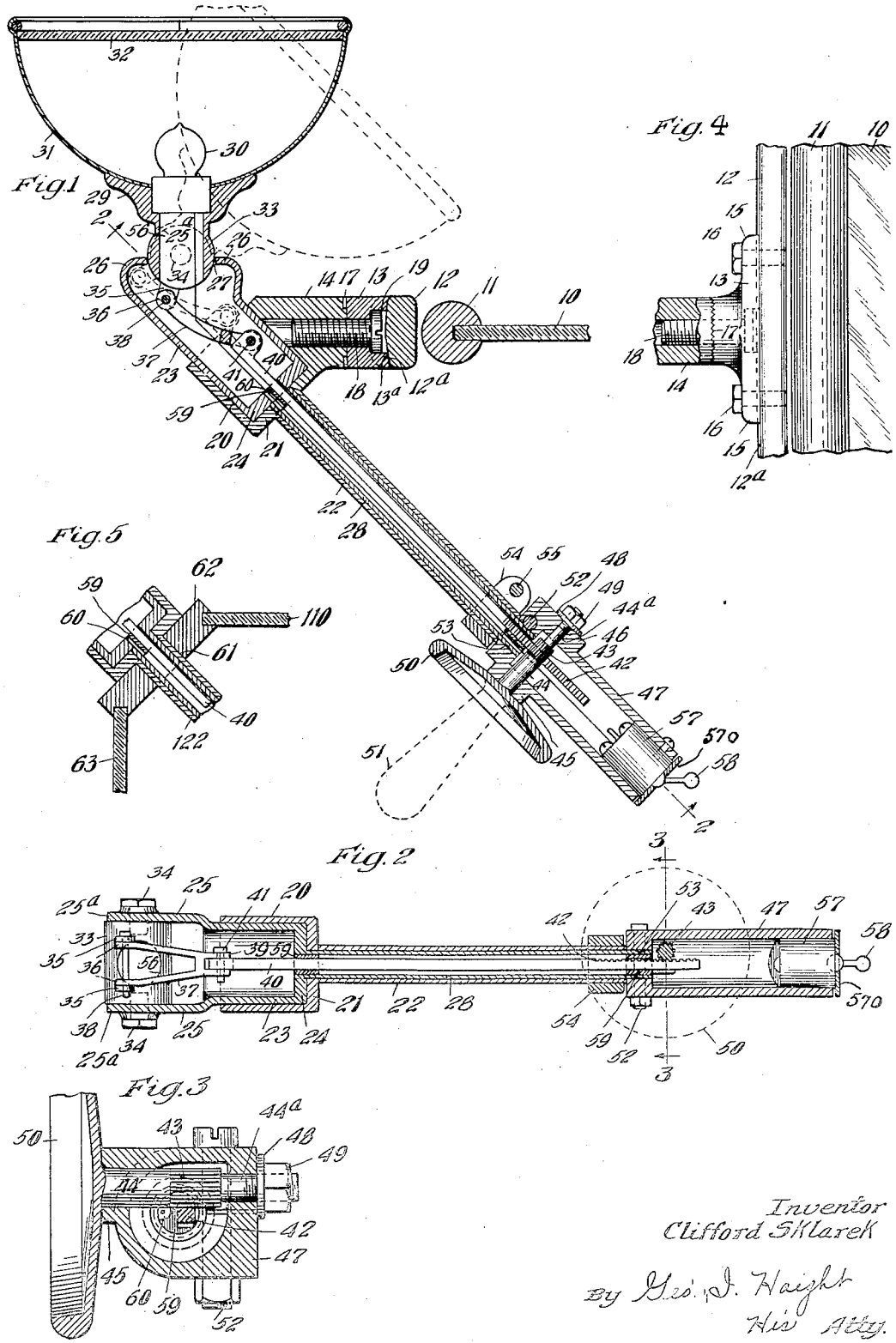
Inventor
Clifford Sklarek
By Geo. I. Haight
His Atty.

Patented July 3, 1928.

1,675,915

UNITED STATES PATENT OFFICE.

CLIFFORD SKLAREK, OF CHICAGO, ILLINOIS, ASSIGNOR TO INTERNATIONAL SPOT-LIGHT CORPORATION, OF CHICAGO, ILLINOIS, A CORPORATION OF ILLINOIS.

DIRIGIBLY-MOUNTED LIGHT.

Application filed April 25, 1921, Serial No. 464,069. Renewed October 7, 1927.

This invention relates to improvements in dirigibly mounted lights.

One object of my invention is to provide a spot light mounting which is especially adapted for automobiles of the closed body type in which the light is located outside of the car body and the means for operating it located on the interior thereof convenient to the driver, the arrangement being such that it may be readily applied to any type of closed body automobile at very small expense and without weakening any of the body structure.

Another object of the invention is to provide a universally adjustable spotlight in which all of the working parts are enclosed to protect them from the weather.

Other objects of the invention are to provide a spot light mounting especially adapted for automobiles having a wind shield wherein an electric light is employed and the wiring therefor entirely concealed and weather protected within the mounting; wherein the control switch for the light is placed convenient to the operator and adjacent the means used in adjusting the spot light; and wherein the mounting is adjustable so as to readily adapt it for application to windshields having different slopes.

The invention furthermore consists in the improvements in the parts and devices and in the combinations of the parts and devices herein shown, described and made the subject matter of claims.

In the drawing forming a part of this specification, Figure 1 is a horizontal, sectional view taken through a portion of an automobile windshield structure and my improved mounting as applied thereto. The dotted lines indicate a different adjusted position of the light and lamp holder. Figure 2 is a vertical, sectional view corresponding substantially to the section line 2—2 of Figure 1. Figure 3 is a vertical, sectional view corresponding substantially to the line 3—3 of Figure 2 and reproduced on an enlarged scale. Figure 4 is an elevational view of a portion of the windshield structure and the parts of the mounting immediately adjacent thereto. And Figure 5 is a broken, sectional view corresponding to Figure 1 illustrating my improvements as applied to an automobile of the closed body type, In said drawing and referring first to the construction illustrated in Figures 1 to 4 inclusive, 10 denotes a portion of one of the usual glass windows employed in a windshield of an automobile, the same being secured in a suitable sash, a portion of which is shown at 11. As is well known, the general practice is to adjustably mount the windows in a suitable windshield framework, one side post of which is indicated at 12. It is customary to make such side posts or frame members 12 of the cross section shown in Figure 1, that is, with the outer face thereof slightly oppositely beveled as indicated at 12$^a$—12$^a$.

In carrying out my invention, I preferably employ a support proper consisting of two parts, a base member 13 and an arm 14. As shown in Figure 4, the base member 13 has a vertically elongated flange section 15 adapted to be permanently and rigidly attached to the side post or frame member 12 as by the screws 16—16. In order to insure the base member 13 obtaining a solid firm bearing on the post 12, the base member is preferably slightly undercut or oppositely inwardly beveled as indicated at 13$^a$ to conform to the beveled surfaces 12$^a$—12$^a$, as shown in Figure 1.

In some types of automobiles, the windshield framework extends vertically whereas in others it is sloped upwardly and toward the rear of the automobile. In order to adapt my improvement to any slope of windshield framework, I employ an adjustable connection between the base member 13 and the arm 14. This adjustable connection is preferably in the form of complemental circularly arranged series of radial teeth or notches 17 on the meeting faces of the base 13 and arm 14 and a machine screw 18 which is passed through the base 13 and threaded to the arm 14, the head of said screw being positioned within a countersink 19 in the base 13. With this arrangement, it is evident that the arm 14 can be angularly adjusted about a horizontal axis to any desired degree with respect to the base 13, and by tightening the screw 18 before the base 13 is secured to the post 12, securely locked in the desired position. It will be observed that the screw 18 is entirely concealed and weather protected.

The main arm 14 is formed with a relatively deep cylindrical bearing or socket portion 20 open at its outer end and having a back wall 21. The axis of said cylindrical bearing 20 is preferably arranged at an angle of approximately 45° with respect to the axis of the screw 18 or, stated in another manner, at an angle of approximately 45° with respect to the length of the machine. Said back wall 21 is formed with a central circular aperture and extending from the rear or inner side of said back wall 21 is a hollow tube-like extension or arm 22 either formed integrally with or otherwise rigidly attached to the arm 14. It will be noted that the hollow arm or extension 22 extends in a general direction toward the driver's or operator's seat and its length will be varied to suit different conditions. Fitting within and rotatably mounted in the cylindrical bearing 20, is a hollow sleeve-like or casing member 23. Said carrier sleeve or carrier 23 has an integral inner or back wall 24 and a cylindrical side wall throughout the major portion of its length, the outer end of said carrier sleeve 23 being specially formed however, so as to provide upper and lower flat webs 25—25 (see Figure 2), and inturned ends 26—26 leaving an opening 27 between the edges thereof. Integrally formed with or otherwise rigidly secured to said carrier sleeve 23 is a hollow arm or extension of tube-like formation 28 extending from the inner or rear side of the said wall 24 within and through the tube like arm 22, the latter forming a bearing for the hollow tube-like arm 28. It will be noted in Figure 1 that the hollow arm 28 is extended at its inner end a short distance beyond the end of the arm 22 in order to have applied thereto certain parts of the adjusting mechanism, as hereinafter described.

The carrier sleeve 23 acts as a support for the lamp holder proper 29 which may be of any suitable form. As shown, the holder 29 is provided with a suitable socket for an electric light bulb 30, and has a reflector 31 and glass cover 32. At its inner end, the holder 29 is formed with a cylindrical enlargement 33 which is oscillatably mounted between said upper and lower webs 25—25 and extensions 25ª—25ª thereof. The pivotal mounting is formed by any suitable means—as for instance the upper and lower pivot-forming screws 34—34 which are supported in the webs 25 and have their inner ends extending into the cylindrical section 33 to provide the pivotal supports for the latter. It will be noted that the diameter of the cylindrical section 33 corresponds substantially to the width of the opening 27 left between the end walls 26 so that the interior of the carrier sleeve 23 is fully protected from the weather and elements. The pivotal axis about which the lamp holder 29 is oscillatable extends at right angles to the axis of the cylindrical journal bearing 20.

For oscillating the lamp holder 29 about its pivotal axis with respect to the carrier sleeve 23, I provide the following means. At its inner end, the lamp holder is provided with upper and lower spaced radially extending perforated lugs 35—35 to which are pivotally connected the forked ends 36—36 of a yoke 37, the pivotal connection being effected by a bolt 38 as best shown in Figure 2. The opposite end of said yoke 37 is forked as indicated at 39 to receive therebetween the outer end of an operating link 40 which is pivotally connected thereto by another shorter bolt 41. The link 40 extends through a suitable opening in the walls 24 and 21 and longitudinally within the hollow arm 28 and beyond the end of the latter, as shown in Figures 1 and 2. At its inner or free end, said link 40 is formed with a straight rack 42 on its upper face with which cooperates a gear wheel 43 preferably formed integral with a stud shaft 44. Said shaft 44 is rotatably mounted in suitable bearing lugs 45 and 46 provided in a hollow block 47. At its righthand end, as viewed in Figure 3, the shaft 44 is of reduced diameter as indicated at 44ª and said shaft is prevented from being pulled outwardly by any suitable means such as the washer 48 and nut 49. At its opposite or larger end, the shaft 44 is provided with a manually operable hand grip which may take either the form of the disc 50 shown in full lines in Figures 1 and 3 or an elongated handle 51 as shown by dotted lines in Figure 1. With this arrangement it is evident that the shaft 44 can be rotated in either direction and in so doing the link 40 will be reciprocated inwardly or outwardly, thereby oscillating the lamp holder about its pivotal axis. By tightening the nut 49, enough friction may be created between the hub of the disc 50 and the block 47, to prevent accidental shifting of the holder or link. In actual practice, I preferably allow the lamp holder oscillation about its pivotal axis through an arc of about 90°.

The hollow block 47 is rigidly secured to the projecting end of the tube-like arm 28 by any suitable means as for instance by the driven friction pin 52 which engages in a suitable recess in the block 47 and an annular shallow groove 53 in the tube-like arm 28. In this manner the block 47 is prevented from oscillation with respect to the arm 28 and hence both are compelled to rotate in unison and also the block is prevented from being pulled axially from the arm 28. On account of the rigid connection between the arm 28 and block 27, it is evident that the operator by using the same hand employed to grasp the disc 50 or handle 51 and at the same time therewith, is enabled to rotate said hollow arm 28 and consequently the carrier sleeve 23. Unlimited oscillating or rotative movement is thus permitted about the axis of rotation of the carrier sleeve 23 and consequently universal adjustment of the lamp holder is obtained with the utmost convenience and by grasping a single element readily accessible to the operator. In order to create sufficient friction between the two tubular members 28 and 22 to hold the lamp in any adjusted position, I may provide a split friction clamp 54 which surrounds the hollow arm 22 and is adapted to be adjustably clamped with respect thereto by means of a screw 55. If desired, the end of the hollow arm 22 may be slotted within the clamp 54 to increase the effectiveness of the latter.

In order to render the switching on and off of the light as convenient as possible, I run the electric wires from the bulb 30 through a suitable opening 56 in the holder 29 and thence down through the hollow arm 28 to the terminal piece 57 at the outer end of the block 47 the end of the hollow block being closed by a removable plate 570. A switch lever 58 is shown extending through the plate 570 and by which the circuit may be made or broken.

In order to provide suitable guides for the link 40 and prevent its flexing or disengagement from the gear 43, I employ two plugs 59—59, one at each end of the hollow arm 28. Each of said plugs is provided with a rectangular opening to conform to the cross section of the link 40 as best shown in Figure 3 and in addition each plug is suitably apertured as indicated at 60 to permit the passage of the electric wires therethrough.

Referring now to the construction illustrated in Figure 5, the arrangement is substantially the same as that shown in the other figures except that I show the hollow tube-like arm 122 extending through a corresponding opening 61 in the corner post or molding 62 of the body superstructure. As will be understood, the front windshield glass 110 is held by said corner post 62 as is also the side glass 63.

From the showing of Figure 5, it will be evident that my device may be readily operated from the interior of a closed car and that the only thing required to accommodate my device to a closed type or car is to bore or drill a comparatively small hole through the corner molding which obviously can be done at practically no expense, without weakening or otherwise injuring the body structure and without destroying the attractive features of the car body.

From the preceding description, it will be seen that all of the parts are of comparatively simple formation, and may be readily manufactured and assembled at small expense, that the desirable universal adjustment of the light is obtained, that the adjustment is effected by what may be considered practically a single movement of the hand of the operator, that all of the operating mechanism and wiring are weather protected, and that the control switch may be manipulated by a finger or thumb of the same hand which effects the adjustment of the light itself.

I have herein shown and described what I now consider the preferred manner of carrying out the invention but the same is merely illustrative and I contemplate all changes and modifications that come within the scope of the claims appended hereto.

I claim:

1. In a dirigible light mounting, the combination with a support adapted to be secured to a relatively stationary member, said support having a journal bearing therein and a rigid hollow tube-like arm extending from one side thereof in axial alinement with the axis of said bearing; of a hollow casing member rotatably mounted in said bearing and having also a rigid hollow cylindrical arm extending axially therefrom through and beyond said first named arm, said casing being provided with a bearing forming opening at the opposite end of said member; a lamp holder provided with a pivotal bearing projection mounted within said bearing opening to oscillate about an axis perpendicular to the first named axis, said bearing projection snugly fitting the walls of said opening; means including a reciprocating link, connected to said lamp holder and extending therefrom through said hollow casing member and the hollow arm of the latter, said link being entirely within the casing member; and manually operable means, at the inner end of said arms, for effecting reciprocation of said link and adapted also for rotating said member about said first named axis.

2. In a dirigible light mounting, the combination with a support adapted to be rigidly secured to a relatively stationary element, said support comprising an axially rotatably adjustable part adapted to be clamped in fixed relation to the other part; of a carrier having an opening therethrough, said carrier being oscillatably mounted on said adjustable part of said support to turn about a substantially horizontally extending axis; a hollow extension rigid with said carrier and extending therefrom to one side of said support and through which oscillation of said member is adapted to be effected; a lamp holder pivotally mounted on said carrier on the opposite side of the support and arranged to oscillate about an axis extending at right angles to the first named axis; means operatively associated with said lamp holder and including an element extending through said hollow extension to the free end of the latter; and manually operable means, located at the free end of said hollow extension, for actuating said first named means and for turning said rigid extension.

3. In a dirigible light, the combination with relatively fixed supporting means; a lamp movable about axes disposed substantially at right angles to each other; operating members one of which is rotatably mounted on said supporting means and the other of which is disposed within said first member; means for effecting independent movement of said operating members, said means including a hollow handle support adapted to be rigidly but detachably secured to the outer operating member to swing said lamp about one axis, said handle support having one end provided with an opening in line with the longitudinal axis of the outer operating member, and a handle rotatably carried by said handle support, the longitudinal axis of said handle being disposed substantially at right angles to the longitudinal axis of said outer operating member and said handle being rotatable about its own longitudinal axis and provided with a gear secured thereto adapted to cooperate with said inner member to effect movement of said lamp about a different axis; a removable closure for covering the open end of said handle support, said closure, with the wall of said support providing a chamber therein, and a switch finger lever associated with said closure and projecting to the exterior thereof; a switch block enclosed within said chamber and operable by means of said finger lever; and means affording electrical communication of said switch with said lamp.

4. In a device of the character described, the combination with elongated inner and outer operating members; of a unit comprising a hollow handle support adapted to be rigidly but detachably secured to the outer operating member, said handle support having means defining an opening disposed in line with the longitudinal axis of said outer member, said handle support having a handle rotatably carried thereby with the longitudinal axis of said handle disposed at an angle to the longitudinal axis of the outer operating member, said handle being rotatable about its own longitudinal axis and provided with a gear adapted to co-operate with said inner member to effect movement thereof; a removable closure for covering the open end of said handle support, said closure with the wall of said support providing a chamber therein, said closure having a switch finger lever associated therewith and projecting to the exterior thereof; a switch enclosed within said chamber and operable by means of said finger lever; and means affording electrical communication of said switch along said operating members.

In witness that I claim the foregoing I have hereunto subscribed my name this 16th day of April, 1921.

CLIFFORD SKLAREK.

DISCLAIMER 1,675,915.—*Clifford Sklarek*, Chicago, Ill. DIRIGIBLY-MOUNTED LIGHT. Patent dated July 3, 1928. Disclaimer filed June 15, 1932, by the assignee, *International Spotlight Corporation*.

Hereby enters this disclaimer to those claims in said specification which are in the following words, to-wit:

"3. In a dirigible light, the combination with relatively fixed supporting means; a lamp movable about axes disposed substantially at right angles to each other; operating members one of which is rotatably mounted on said supporting means and the other of which is disposed within said first member; means for effecting independent movement of said operating members, said means including a hollow handle support adapted to be rigidly but detachably secured to the outer operating member to swing said lamp about one axis, said handle support having one end provided with an opening in line with the longitudinal axis of the outer operating member, and a handle rotatably carried by said handle support, the longitudinal axis of said handle being disposed substantially at right angles to the longitudinal axis of said outer operating member, and said handle being rotatable about its own longitudinal axis and provided with a gear secured thereto adapted to cooperate with said inner member to effect movement of said lamp about a different axis; a removable closure for covering the open end of said handle support, said closure, with the wall of said support providing a chamber therein, and a switch finger lever associated with said closure and projecting to the exterior thereof; a switch block enclosed within said chamber and operable by means of said finger lever; and means affording electrical communication of said switch with said lamp.

"4. In a device of the character described, the combination with elongated inner and outer operating members; of a unit comprising a hollow handle support adapted to be rigidly but detachably secured to the outer operating member, said handle support having means defining an opening disposed in line with the longitudinal axis of said outer member, said handle support having a handle rotatably carried thereby with the longitudinal axis of said handle disposed at an angle to the longitudinal axis of the outer operating member, said handle being rotatable about its own longitudinal axis and provided with a gear adapted to co-operate with said inner member to effect movement thereof; a removable closure for covering the open end of said handle support, said closure with the wall of said support providing a chamber therein, said closure having a switch finger lever associated therewith and projecting to the exterior thereof; a switch enclosed within said chamber and operable by means of said finger lever; and means affording electrical communication of said switch along said operating members."

[*Official Gazette July 5, 1932.*]